(12) United States Patent
Lunn et al.

(10) Patent No.: US 11,286,322 B2
(45) Date of Patent: Mar. 29, 2022

(54) BRANCHED POLYMERIC DISPERSANTS, AQUEOUS PIGMENT DISPERSIONS, AND AQUEOUS COATING COMPOSITIONS THEREOF

(71) Applicants: Dow Global Technologies, LLC, Midland, MI (US); Rohm and Haas Company, Collegeville, PA (US); The Regents of the University of California, Oakland, CA (US)

(72) Inventors: David Lunn, Abingdon (GB); Sungbaek Seo, Gyeongsangnam-do (KR); Craig Hawker, Santa Barbara, CA (US); Alaina McGrath, Santa Barbara, CA (US); Paul Clark, Midland, MI (US); Antony Van Dyk, Blue Bell, PA (US); Sang-Ho Lee, Ulsan (KR)

(73) Assignees: DOW GLOBAL TECHNOLOGIES LLC, Midland, MI (US); ROHM AND HAAS COMPANY, Collegeville, PA (US); THE REGENTS OF THE UNIVERSITY OF CALIFORNIA, Collegeville, PA (US)

( * ) Notice: Subject to any disclaimer, the term of this patent is extended or adjusted under 35 U.S.C. 154(b) by 0 days.

(21) Appl. No.: 17/264,214

(22) PCT Filed: Aug. 1, 2019

(86) PCT No.: PCT/US2019/044640
§ 371 (c)(1),
(2) Date: Jan. 28, 2021

(87) PCT Pub. No.: WO2020/046531
PCT Pub. Date: Mar. 5, 2020

(65) Prior Publication Data
US 2021/0238327 A1 Aug. 5, 2021

Related U.S. Application Data

(60) Provisional application No. 62/725,409, filed on Aug. 31, 2018.

(51) Int. Cl.
*C08F 20/06* (2006.01)
*C09D 7/65* (2018.01)
(Continued)

(52) U.S. Cl.
CPC ...... *C08F 220/06* (2013.01); *C08F 220/1804* (2020.02); *C09D 7/65* (2018.01);
(Continued)

(58) Field of Classification Search
CPC .................................................... C08F 220/06
See application file for complete search history.

(56) References Cited

U.S. PATENT DOCUMENTS 3,945,843 A 3/1976 Holty et al.
5,770,646 A * 6/1998 Antonelli ............ C08F 290/046
524/504
(Continued)

FOREIGN PATENT DOCUMENTS

EP 1371688 A2 12/2003
WO 0144376 A1 6/2001
(Continued)

OTHER PUBLICATIONS

Andreas Muehlebach and Francois Rime, Journal of Polymer Science: Part A: Polymer Chemistry, vol. 41, 3425-3439 (2003).*
(Continued)

*Primary Examiner* — Vu A Nguyen
(74) *Attorney, Agent, or Firm* — Cantor Colburn LLP

(57) ABSTRACT

A branched polycarboxylic acid or salt thereof, wherein the average number of branches is (2) to (100) and the average degree of polymerization of the branches is (2) to (50), is an effective polymeric dispersant. More specifically, the polymeric dispersant is a branched polycarboxylic acid or salt thereof, in which the branched polycarboxylic acid is derived from polymerization of (meth)acrylic acid; the average degree of polymerization is (10) to (150); the average number of branches is (2) to (20); and the average degree of polymerization of the branches is (2) to (30). The branched polycarboxylic acid or salt thereof can be combined with a pigment to form an aqueous dispersion. An aqueous coating composition includes the aqueous dispersion; a polymeric binder; and a rheology modifier.

10 Claims, 3 Drawing Sheets

(51) Int. Cl.

| | |
|---|---|
| C09D 133/02 | (2006.01) |
| C08F 220/06 | (2006.01) |
| C08F 220/18 | (2006.01) |
| C09D 17/00 | (2006.01) |

(52) U.S. Cl.
CPC ......... *C09D 17/001* (2013.01); *C09D 17/008* (2013.01); *C08F 2438/01* (2013.01)

(56) References Cited

U.S. PATENT DOCUMENTS

| | | | | |
|---|---|---|---|---|
| 6,174,953 B1* | 1/2001 | Huybrechts | ........... | C08F 290/06 524/504 |
| 6,239,214 B1* | 5/2001 | Huybrechts | ........... | C08F 290/04 524/504 |
| 6,306,209 B1* | 10/2001 | Woodworth | .......... | C08F 265/04 106/401 |
| 6,642,301 B2 | 11/2003 | White et al. | | |
| 6,723,775 B2* | 4/2004 | Lau | ....................... | C08F 265/06 524/460 |
| 6,809,141 B2* | 10/2004 | Fasano | ................ | C08L 23/0815 524/457 |
| 6,818,700 B1* | 11/2004 | Gancet | .................. | C08F 120/06 510/434 |
| 6,936,656 B2* | 8/2005 | Muhlebach | ........... | C08F 293/00 523/334 |
| 2002/0115798 A1 | 8/2002 | Narayan-Sarathy et al. | | |
| 2003/0166755 A1 | 9/2003 | Muhlebach et al. | | |
| 2006/0241209 A1 | 10/2006 | Madle et al. | | |
| 2012/0157596 A1 | 6/2012 | Da Silva et al. | | |

FOREIGN PATENT DOCUMENTS

| | | |
|---|---|---|
| WO | 2010149955 A1 | 12/2010 |
| WO | 2012166691 A1 | 12/2012 |

OTHER PUBLICATIONS

Cheng et al., Macromolecules 2001, 34, 6883-6888.*
Yang et al., Chemistry Letters, vol. 35, No. 2, 2006, pp. 222-223.*
Yang et al., Chemistry Letters, vol. 35, No. 2, 2006, pp. 222-223 (Supporting Information).*
Ran et al., Iran Polym J (2014) 23:663-669.*
Leon et al., Colloid & Polymer Science 272:427-432 (1994).*
Page et al. "A Di-Tert-Butyl Acrylate Monomer for Controlled Radical Photopolymerization," Journal of Poymer Science, 2016, 6 pages.
Das et al. "Flocculation-dispersion characteristics of alumina using a wide molecular weight range of polyacrylic acids"; Colloids and Surfaces A: Physicochem. Eng. Aspects, 2003, vol. 223, pp. 17-25.
Fang et al. "Study of structure-performance relationships of polymeric dispersants on particle dispersion and stablisation"; Royal Science of Chemistry Advances, 2017, vol. 7, pp. 2513-2519.
Farrokhpay "A Review of Polymeric Dispersant Stabilisation of Titania Pigment"; Advances in Colloid and Interface Science, 2009, vol. 151, pp. 24-32.
Farrokhpay et al. "Influence of polymer functional group architecture on titania pigment dispersion"; Colloids and Surfaces A: Physicochem. Eng. Aspects; vol. 253, 2005, pp. 183-191.
International Search Report; International Application No. PCT/US2019/044640; International Filing Date: Aug. 1, 2019; dated Nov. 19, 2019; 6 pages.
Jin et al. "Effects of length of branched-chain of PAA-g-MPEO on dispersion of CaCO3 aqueous suspensions"; Polym. Bull, 2012, vol. 68, pp. 597-605.
Loiseau et al. "Synthesis and Characterization of Poly(acrylic acid) Produced by RAFT Polymerization. Application as a Very Efficient Dispersant of CaCO3, Kaolin, and TiO2"; American Chemical Society, Macromolecules, 2003, vol. 36, No. 9, pp. 3066-3077.
Lunn et al. Scalable Synthesis of an Architectural Library of Well-Defined Poly(Acrylic Acid) Derivatives: Role of Structure on Dispersant Performance, Journal of Polymer Science, Jan. 10, 2019, vol. 57, pp. 716-725.
Mori et al. "New polymeric architectures with (meth)acrylic acid segments"; Progess in Polymer Science, 2003, vol. 28, pp. 1403-1439.
Muehlebach et al. "Synthesis of Well-Defined Macromonomers and Comb Copolymers from Polymers Made by Atom Transfer Radical Polymerization," Journal of Polymer Science, Part A: Polymer Chemistry, Nov. 1, 2003, vol. 41 pp. 3425-3439.
Nicoleau et al. "Oriented aggregation of calcium silicate hydrate platelets by the use of comb-like copolymers"; Soft Matters, 2013, vol. 9, pp. 4864-4874.
Ran "Impact of molecular size of SMA-g-MPEG comb-like polymer on the dispersion of CaCO3 suspensions"; Colloid Polymer Science; vol. 290, 2012, pp. 435-443.
Ran et al. "Effects of Poly(acrylic acid on Rheological and Dispersion Properties of Aqueous TiO2 and Suspensions"; Polymers-Plastics Technology and Engineering, 2007, vol. 46, pp. 1117-1120.
Ren et al. "Star Polymers," Chem. Rev. 2016, 116, 6743-6836.
Written Opinion; International Application No. PCT/US2019/044640; International Filing Date: Aug. 1, 2019; dated Nov. 19, 2019; 10 pages.
IPRP; International Application No. PCT/US2019/044640; International Filing Date: Aug. 1, 2019; dated Jul. 27, 2020, 7 pages.

* cited by examiner

BRANCHED POLYMERIC DISPERSANTS, AQUEOUS PIGMENT DISPERSIONS, AND AQUEOUS COATING COMPOSITIONS THEREOF

CROSS REFERENCE TO RELATED APPLICATIONS

This application is a National Stage application of PCT/US2019/044640, filed Aug. 1, 2019, which claims the benefit of U.S. Provisional Application No. 62/725,409, filed Aug. 31, 2018, both of which are incorporated by reference in their entirety herein.

BACKGROUND

Figure 1:
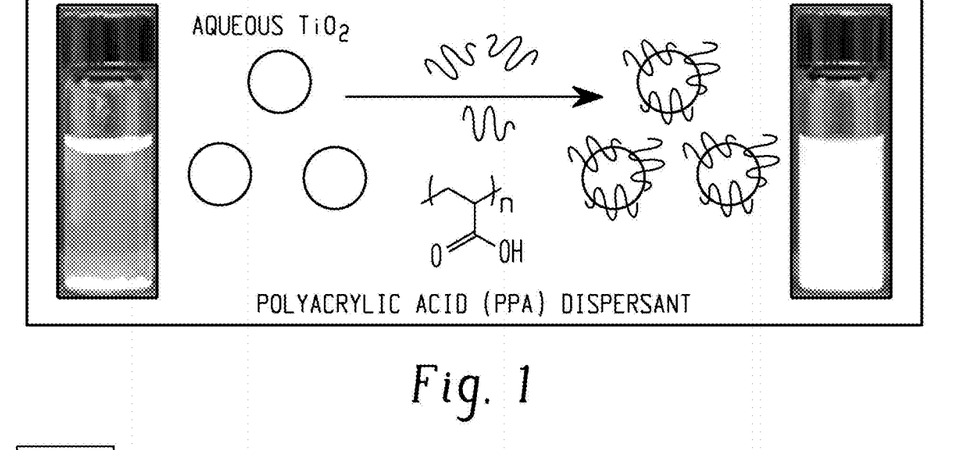
FIG. 1 is a schematic representation of the dispersion of $TiO_2$ pigment particles by PAA. $TiO_2$ powder in water (left photo) is dispersed by adsorption of PAA onto the $TiO_2$ particle surfaces, affording a stable suspension (right photo).
Figure 2:
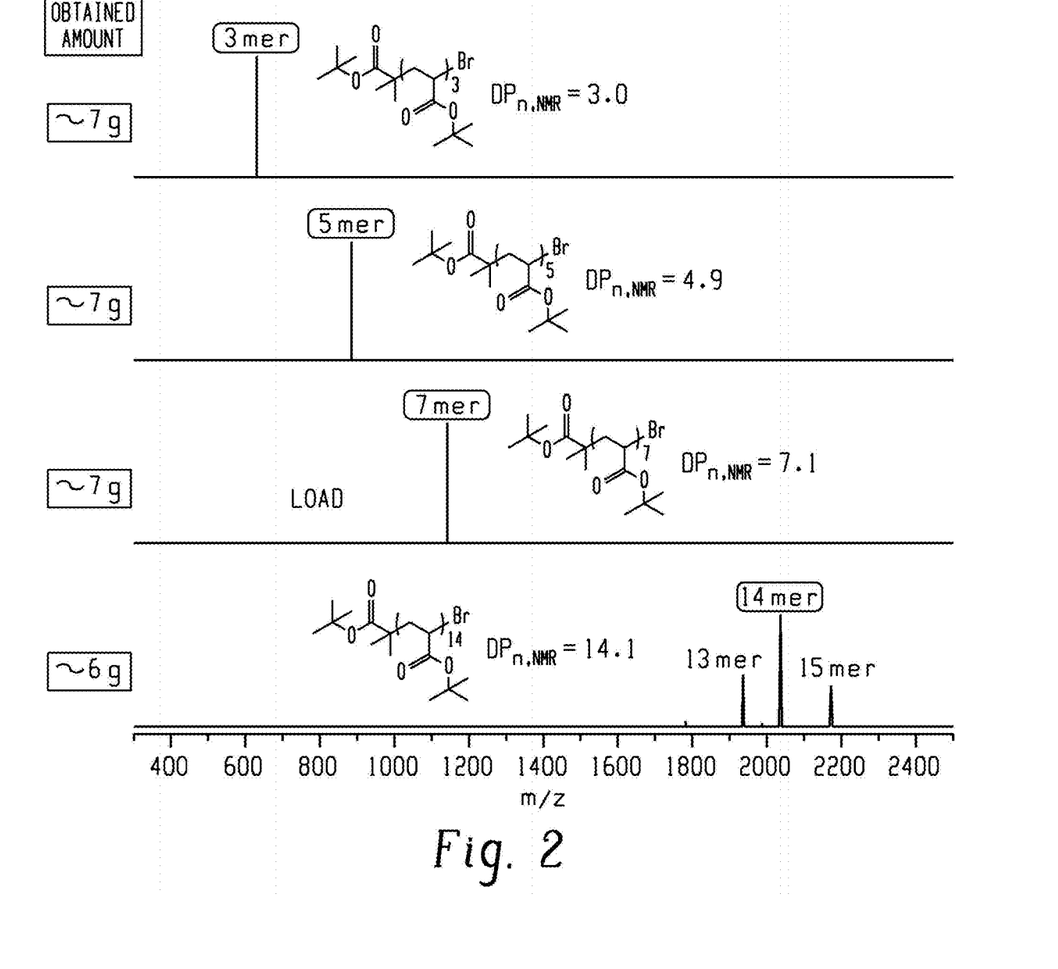
FIG. 2 depicts MALDI-TOF spectra of oligo(tert-butylacrylate) (OTBA) trimer, pentamer, heptamer, and tetradecamer, with $DP_n$ values calculated froth $^1H$ NMR.

Insoluble inorganic pigments, such as titanium dioxide, are frequently utilized to form opaque and bright coatings. Insoluble inorganic fillers, such as calcium carbonate, are frequently used in combination with pigments. Pigments and fillers provide a number of desirable properties, including gloss, opacity, color, and mechanical strength. However pigment particles and filler particles have a tendency to aggregate in coating compositions, which reduces their effectiveness in achieving these desirable properties. Polyelectrolytes, which are water-soluble polymers bearing ionized or ionizable functional groups, are commonly used as dispersants for aqueous coating compositions. They stabilize dispersed particles by adsorption onto the particle surface. Polyacrylic acid (PAA) is a polyelectrolyte that is an effective polymeric pigment dispersant. As indicated in FIG. 1 (left photo), titanium dioxide ($TiO_2$) particles are insoluble in water. PAA (polymer chains) adsorbs on the surface of the $TiO_2$ particles, forming a stable aqueous dispersion of the $TiO_2$ particles in water (right photo).

There is ample room for improvement the effectiveness of commercially available polymeric dispersants. Improvement in the efficiency of adsorption of a dispersant onto pigment particles is desirable. This will improve the dispersion of pigment particles and result in improved light scattering and therefore improved opacity. The hiding power of a coating composition is a function of the spacing of the pigment particles in the dried coating. Maximum light scattering occurs when the pigment particles are spaced far apart from each other, on the order of a few particle diameters, so that there is minimal interference between the light scattered from neighboring particles. In a coating film, the distribution of the opacifying agent particles approaches that of a random distribution. As a result, there exist a substantial number of pigment particles in close proximity to each other, and possibly in direct physical contact with each other. This phenomenon is known as "crowding", and it diminishes light scattering. A dispersant that more efficiently adsorbs and disperses pigment particles is therefore highly desirable.

Improvement in the effectiveness of polymeric dispersants can result in a reduced minimum amount of dispersant needed to achieve optimal pigment dispersion. Such an improvement would reduce the cost associated with dispersing pigments, thereby reducing the cost of pigmented paints. Acrylic acid and methacrylic acid are relatively inexpensive monomers, which means that polyacrylic acid (PAA) and polymethacrylic acid (PMAA) are relatively inexpensive polymeric dispersants. Thus, it is also desirable to provide an improved pigment dispersant based on PAA or PMAA in particular. Moreover, the production of an improved dispersant based on PAA or PMAA is likely to fit into existing manufacturing equipment and processes, minimizing capital costs for manufacturing.

Commercial polymeric dispersants often contain by-products and impurities that are not removed in the manufacturing process, and which are not themselves active as dispersants. Thus, the content of active dispersant in a commercial polymeric dispersant can be less than the reported solids content. It is therefore desirable to have a dispersant with increased activity, so that its performance is not adversely affected by the presence of inactive by-products and impurities. It is also desirable to have a polymeric dispersant which provides enhanced opacity in coating films, which provides enhanced dispersion of colorant pigments (color acceptance), and which provides improved paint storage stability, for example as measured by changes in paint viscosity.

BRIEF DESCRIPTION

A polymeric dispersant comprises a branched polycarboxylic acid or salt thereof, wherein the average number of branches is 2 to 100 and the average degree of polymerization of the branches is 2 to 50. More specifically, a polymeric dispersant comprises a branched polycarboxylic acid or salt thereof, wherein: the branched polycarboxylic acid is derived from polymerization of (meth)acrylic acid; the average degree of polymerization is 10 to 150; the average number of branches is 2 to 20; and the average degree of polymerization of the branches is 2 to 30. The branched polycarboxylic acid or salt thereof can be combined with a pigment to form an aqueous dispersion. An aqueous coating composition comprises said aqueous dispersion; a polymeric binder; and a rheology modifier.

BRIEF DESCRIPTION OF THE DRAWINGS

Referring now to the drawings.

DETAILED DESCRIPTION OF THE INVENTION

The present inventors have developed an improved polymeric dispersant for the dispersion of pigments. The improved polymeric dispersant is a branched polycarboxylic acid or salt thereof, wherein the average number of branches is 2 to 100 and the average degree of polymerization of the branches is 2 to 50. The branched polycarboxylic acid as described herein was found to provide many performance improvements compared to linear polycarboxylic acids, especially in pigmented aqueous coating compositions. For example, the branched polycarboxylic acid provides enhanced opacity in dried coating films, as characterized by light scattering per unit thickness ("S/mil"), enhanced dispersion of colorant pigments, or color acceptance, as measured by the "rub-out" test described herein, and enhanced storage stability, as measured by paint viscosity.

The branched polycarboxylic acid can be an addition polymer of carboxylic acid-functional ethylenically unsaturated monomers. The carboxylic acid-functional ethylenically unsaturated monomer can be, for example, acrylic acid, methacrylic acid, crotonic acid, itaconic acid, an itaconic acid monoester, fumaric acid, a fumaric acid monoester, maleic acid, a maleic acid monoester, or a combination comprising at least one of the foregoing carboxylic acid-functional ethylenically unsaturated monomers. The branched polycarboxylic acid can also be an addition polymer of a carboxylic acid anhydride-functional ethylenically unsaturated monomer, in which the carboxylic acid anhydride functionality can be converted to carboxylic acid functionality, for example itaconic anhydride and maleic anhydride. The carboxylic acid-functional ethylenically unsaturated monomer can be (meth)acrylic acid, i.e. acrylic acid, methacrylic acid, or a combination thereof. Thus in some embodiments, the branched polycarboxylic acid or salt thereof of is derived from polymerization of (meth)acrylic acid, for example it can be a polyacrylic acid (PAA) or a polymethacrylic acid (PMAA).

A used herein a "salt" can be an alkali metal salt, an alkaline earth metal salt, an ammonium salt, or a quaternary ammonium salt. The salt can be, for example, a lithium salt, a potassium salt, or an ammonium salt. In some embodiments, the salt is a sodium salt.

The branched polycarboxylic acid can be a copolymer of carboxylic acid-functional ethylenically unsaturated monomer and other ethylenically unsaturated monomers. The other ethylenically unsaturated monomer can be an ionic monomer, for example, a sulfonic acid-functional monomer, a phosphoric acid-functional monomer, a phosphonic acid-functional monomer, or a salt thereof. Examples of sulfonic-acid functional monomers include 2-sulfoethyl (meth)acrylate, 3-sulfopropyl (meth)acrylate, styrene sulfonic acid, vinyl sulfonic acid, and 2-(meth)acrylamide-2-methyl propanesulfonic acid. Examples of phosphoric acid-functional monomers include 2-phosphoethyl (meth)acrylate, 2-phosphopropyl (meth)acrylate, 3-phosphopropyl (meth)acrylate, phosphobutyl (meth)acrylate, and 3-phospho-2-hydroxypropyl (meth)acrylate. The phosphoric acid-functional monomer can also be a phosphoric acid ester of an alkoxylated hydroxyalkyl (meth)acrylate, for example a hydroxyethyl or hydroxypropyl (meth)acrylate ethoxylate or propoxylate having 1 to 50 ethoxy or propoxy repeat units. The ionic monomer can also be 2-(N,N-dimethylamino)ethyl (meth)acrylate.

The other ethylenically unsaturated monomer can be a nonionic monomer. The nonionic monomer can be a hydrophilic non-ionic ethylenically unsaturated monomer, for example hydroxyethyl (meth)acrylate, hydroxypropyl (meth)acrylate, polyethylene glycol (meth)acrylate, or (meth)acrylamide. The nonionic monomer can also be a hydrophobic non-ionic monomer, for example an alkyl ester of (meth)acrylic acid, such as methyl (meth)acrylate, ethyl (meth)acrylate, butyl (meth)acrylate, 2-ethyhexyl (meth) acrylate, decyl (meth)acrylate, isodecyl (meth)acrylate, and lauryl (meth)acrylate. The nonionic monomer can also be styrene, or a substituted styrene such as α-methyl styrene, an α-olefin such as ethylene, propylene, 1-decene, and diisobutylene, or butadiene. The nonionic monomer can also be a vinyl monomer such as acrylonitrile, vinyl chloride, vinyl acetate, vinyl butyrate, or a vinyl ester of a branched, tertiary-alkyl alcohol, sold under the tradename VeoVa™, for example VeoVa™ 9 Monomer, VeoVa™ 10 Monomer, VeoVa™ 11 Monomer, available from Momentive Specialty Chemicals. In some embodiments, the polycarboxylic acid is derived from copolymerization of (meth)acrylic acid with at least one other (meth)acrylic or vinyl monomer.

In some embodiments, the polycarboxylic acid has an average degree of polymerization of 10 to 500. Within this range, the average degree of polymerization can be 10 to 400, 300, 200, 150, or 100, for example 10 to 150, or 15 to 100. The polycarboxylic acid can have a number-average molecular weight of 500, 1,000, or 2,000 to 5,000, 10,000, 15,000, 20,000, or 50,000 g/mol, as measured by size exclusion chromatography relative to polystyrene/polymethyl methacrylate standards. In some embodiments, the number-average molecular weight is 2,000 to 15,000 g/mol. Polydispersity is a measure of the width of a molecular weight distribution, and is defined as the ratio of weight-average molecular weight to number-average molecular weight. In some embodiments, the branched polycarboxylic acid or salt thereof, has a polydispersity of less than or equal to 2.5. Within this range, the polydispersity can be less than or equal to 2.0, 1.5, 1.4, 1.3, 1.2, or 1.1.

There can be spacer monomers between branch points of the branched polycarboxylic acid or salt thereof. In other embodiments, at least some of the branches of the branched polycarboxylic acid or salt thereof are adjacent to one another, i.e., are located on adjacent monomers, i.e., are located on adjacent monomers with no spacer monomers.

The present inventors have found a particular combination of average number of branches per polymer chain and average degree of polymerization of the branches of polycarboxylic acid provides improvements in opacity, color acceptance, and storage stability for polycarboxylic acid dispersants. As mentioned above, the polycarboxylic acid has an average number of branches of 2 to 100. Within this range, the polycarboxylic acid can have an average number of branches of 2, 3, or 4 to 50, 40, 30, 20, or 15. In some embodiments, the polycarboxylic acid has an average number of branches of 2 to 30, 2 to 20, or 3 to 10. Also, as mentioned above, the average degree of polymerization of the branches is 2 to 50. Within this range, the average degree of polymerization of the branches can be 3 or 4 to 40, 30, 20, or 10, for example 2 to 30, 2 to 20, or 2 to 10. In some embodiments, the branched polycarboxylic acid or salt thereof is derived from polymerization of (meth)acrylic acid, wherein the average degree of polymerization is 10 to 150; the average number of branches is 2 to 20; and the average degree of polymerization of the branches is 2 to 30; or the branched polycarboxylic acid or salt thereof is derived from polymerization of (meth)acrylic acid, wherein the average degree of polymerization is 50 to 100; the average number of branches is 3 to 10; and the average degree of polymerization of the branches is 3 to 8.

The branched polycarboxylic acids are effective dispersants for inorganic pigments in water. Thus, an aqueous dispersion comprises the branched polycarboxylic acid or salt thereof and a pigment. The term "a pigment" as used herein refers to both the singular and plural form, and refers to both pigments and fillers, and includes white pigments, color pigments, fillers, and combinations comprising at least one of the foregoing. Examples of inorganic white pigments include rutile titanium dioxide, barium sulfate, zinc oxide, zinc sulfide, basic lead carbonate, antimony trioxide, lithopones (zinc sulfide and barium sulfate), and combinations comprising at least one of the foregoing pigments. Examples of inorganic color pigments include iron oxides, carbon black, graphite, zinc yellow, zinc green, ultramarine, manganese black, manganese violet, Prussian blue, and combinations comprising at least one of the foregoing color pigments. Examples of organic color pigments include azo dyes, anthraquinonoid dyes, indigoid dyes, toluidine red, para red, toluidine red, para red, indigo, dioxazine, quinacridone, phthalocyanine, isoindolinone, sepia, gamboge, Hansa yellow, Cassel brown, metal complex pigments, and combinations comprising at least one of the foregoing pigments.

Fillers are derived from naturally occurring minerals, and are relatively colorless in coating films. They can be used in combination with more expensive pigments, for example titanium dioxide, to reduce raw material costs. Examples of extenders are nepheline syenite, (25% nepheline, 55% sodium feldspar, and 20% potassium feldspar), feldspar (an aluminosilicate), diatomaceous earth, calcined diatomaceous earth, calcium carbonate, talc (hydrated magnesium silicate), aluminosilicates, silica (silicon dioxide), alumina (aluminum oxide), clay, (hydrated aluminum silicate), kaolin (kaolinite, hydrated aluminum silicate), mica (hydrous aluminum potassium silicate), pyrophyllite (aluminum silicate hydroxide), perlite, baryte (barium sulfate), wollastonite (calcium metasilicate), and a combination comprising at least one of the foregoing extenders. In an exemplary embodiment, the extenders that can be used are nepheline syenite, calcined diatomaceous earth, and combinations comprising one or more of the foregoing extenders.

The aqueous dispersion comprising the branched polycarboxylic acid or salt thereof and the pigment can be utilized in aqueous coating compositions. Thus in some embodiments, an aqueous coating composition comprises the aqueous dispersion of branched polycarboxylic acid and pigment; a polymeric binder; and a rheology modifier. Examples of polymeric binders include styrene-butadiene copolymers, styrene-acrylate polymers, (meth)acrylate polymers, polyvinyl chloride polymers, ethylene-vinyl acetate polymers, vinyl acetate polymers, and combinations comprising at least one of the foregoing polymers.

The amount of pigment in a coating composition can be described by pigment volume concentration (PVC). PVC is defined as the ratio of the volume of pigments, including fillers, to the total volume of binder, pigments, including fillers, in a dried coating film. For gloss to semi-gloss paints, the PVC can be 5 to 35%, specifically 10 to 30%, or 15 to 25%. For sheen to flat paints, the PVC can be 30 to 90%, specifically 35 to 85%, or 40 to 80%.

The coating composition can further comprise any one or more surfactant, defoamer, thickener, coalescent, neutralizing agent, adhesion promoter, opaque polymer, optical brightener, light stabilizer, antioxidant, preservative, mildewcide, biocide, or combinations comprising at least one of the foregoing additives.

The coating composition can be used to prepare coating films. Thus, a method of making a coating film comprises applying the coating composition onto a substrate, and drying or allowing the applied coating composition to dry. The coating composition is suitable for application onto a variety of substrates including wood, masonry, cementitious substrates (such as concrete, stucco, and mortar) stone, cellulosic substrates (such as paperboard, wall paper, wall board, and paper), glass, metal, asphalt, leather, plastics, woven and non-wovens (such as cloth, wool, synthetic and natural fibers, and textiles).

This disclosure is further illustrated by the following aspects, which are not intended to limit the claims.

Aspect 1. A branched polycarboxylic acid or salt thereof, wherein the average number of branches is 2 to 100 and the average degree of polymerization of the branches is 2 to 50.

Aspect 2. The branched polycarboxylic acid or salt thereof of aspect 1, wherein the average degree of polymerization is 10 to 500.

Aspect 3. The branched polycarboxylic acid or salt thereof of aspect 1 or 2, wherein the polydispersity (of the branches) is less than or equal to 2.5.

Aspect 4. The branched polycarboxylic acid or salt thereof of any of aspects 1 to 3, wherein the polycarboxylic acid is derived from polymerization of (meth)acrylic acid.

Aspect 5. The branched polycarboxylic acid or salt thereof of aspect 4, wherein the polycarboxylic acid is derived from copolymerization of (meth)acrylic acid with at least one other (meth)acrylic or vinyl monomer.

Aspect 6. The branched polycarboxylic acid or salt thereof of any of aspects 1 to 5, wherein the salt is an alkali metal salt, an alkaline earth metal salt, an ammonium salt, a quaternary ammonium salt, or a combination comprising at least one of the foregoing salts.

Aspect 7. The branched polycarboxylic acid or salt thereof of any of aspects 1 to 6, wherein the branches are all adjacent to one another.

Aspect 8. A branched polycarboxylic acid or salt thereof, wherein: the branched polycarboxylic acid is derived from polymerization of (meth)acrylic acid; the average degree of polymerization is 10 to 150; the average number of branches is 2 to 20; and the average degree of polymerization of the branches is 2 to 30.

Aspect 9. An aqueous dispersion comprising: the branched polycarboxylic acid or salt thereof of any of aspects 1 to 8; and a pigment.

Aspect 10. An aqueous coating composition comprising: the aqueous dispersion of aspect 9; a polymeric binder; and a rheology modifier.

The disclosure is further illustrated by the following examples, which are not intended to limit the scope of the claims.

EXAMPLES

Materials and Methods

The following a materials for polymer synthesis were purchased from Sigma-Aldrich and used as received: α-ketoglutaric acid (≥99%), sulfuric acid (ACS reagent 95-98%), sodium borohydride (powder, 98%), acryloyl chloride (97%), ethyl bromoisobutyrate (EBiB, 98%), tert-butyl 2-bromoisobutyrate (t-BBiB, ≥98%), copper(I) bromide (CuBr, 99%), N,N,N',N'',N''-pentamethyldiethylenetriamine (PMDETA, 99%), acrylic acid (99%), 1,8-diazabicyclo [5.4.0]undec-7-ene (DBU, 98%), trifluoroacetic acid (TFA, 99%), and trifluoroacetic acid (TFA, 99%). Triethylamine (TEA, 99%) and all solvents were purchased from Fisher Scientific and used as received. Chloro(indenyl)bis(triphenylphosphine)ruthenium(II) (Ru(Ind), >98%), available from Strem Chemicals, was used as received. Tert-butyl acetate (TBA, 99.8%) was purchased from Chem Impex International Inc., and was passed through a column of basic alumina (~150 mesh, Brackman I grade) prior to use in order to remove the inhibitor. Hydrochloric acid (HCl) and sodium carbonate ($Na_2CO_3$) were used as pH modifiers.

Nuclear magnetic resonance spectra were recorded on a Varian 400 MHz, 500 MHz or 600 MHz spectrometer. All $^1$H NMR chemical shifts ($\delta$) are reported in parts per million (ppm), and were measured relative to the signals for residual chloroform (7.26 ppm) or methanol (3.31 ppm) in the deuterated chloroform and deuterated methanol, respectively.

Molecular weight relative to linear polystyrene/polymethyl methacrylate standards was measured by size exclusion chromatography (SEC). SEC was performed on a Waters 2690 separation module equipped with Waters 2414 refractive index and 2996 photodiode array detectors using CHCl$_3$ containing 0.25% triethylamine as eluent at a flow rate of 1 mL/min. Mass spectrometry was performed on a Waters GCT Premier time-of-flight mass spectrometer (EI and FD).

Matrix-Assisted Laser Desorption Ionization Time Of Flight (MALDI-TOF) spectrometry was conducted using a Bruker MICROFLEX™ LRF MALDI TOF mass spectrometer, equipped with a 60 Hz nitrogen laser at 337 nm. Solutions in tetrahydrofuran of 2,5-dihydroxybenzoic acid as a matrix (saturated solution, 10 μL), sodium trifluoroacetate as cationization agent (1.0 mg/mL, 2 μL), and sample (1.0 mg/mL, 10 μL) were mixed, and 0.7 μL of the mixture was applied to the target plate. Spectra were recorded in linear mode.

Color measurements were made using an XRite 8400 spectrophotometer running X-Rite Color Master software version 5.1.1, and calculated using the CIE 1976 L* a* b* color space.

Viscosity measurements (Krebs Units, KU) were made using a BYK Gardner KU-1+ viscometer made by Brookfield Engineering Laboratories Inc., Commerce Blvd., Middleboro, Mass.

Heat aging was conducted at 50° C. in a VWR Scientific 1380 FM forced air oven.

Kubelka-Munk S/mil Hiding Test Method

Two draw-downs were prepared on Black Release Charts (Leneta Form RC-BC) for each test paint using a 1.5-mil Bird draw down bar and the charts allowed to dry overnight. Using a template, 3.25"×4" rectangles were cut out with an X-ACTO knife on each chart. The Y-reflectance was measured using a BYK Gardner Spectro-guide 45/0 Gloss Color spectrophotometer in each of the scribed areas five times measuring on a diagonal starting at the top of the rectangle and the average Y-reflectance recorded. A thick film draw down was also prepared for each paint on Black Vinyl Charts (Leneta Form P121-10N) using a 3" 25-mil block drawdown bar and the charts were allowed to dry overnight. The Y-reflectance was measured in five different areas of the draw down and the average Y-reflectance recorded. Kubelka-Munk hiding value S is given by the following equation:

$$S = \frac{R}{X \times (1-R^2)} \times \ln\frac{1-(R_B \times R)}{1-\frac{R_B}{R}}$$

where X is the average film thickness, R is the average reflectance of the thick film and R$_B$ is the average reflectance of the thin film over black. X can be calculated from the weight of the paint film (W$_{pf}$), density (D) of the dry film, and film area (A). Film area for a 3.25"×4" template was 13 in$^2$.

$$X(\text{mils}) = \frac{W_{P_f}(g) \times 1000(\text{mil/in})}{D(\text{lbs/gal}) \times 1.964(g/\text{in}^3/\text{lbs/gal}) \times A(\text{in})}$$

Rub-Up Test Method

Drawdowns of 3 mil wet thickness were made on Leneta 5C charts with a 3 mil 6" wide applicator. The coatings were dried 24 h at room temperature, and a second 3 mil wet thickness coating was applied. The freshly applied paint was rubbed in a circular motion, 1-1.5" diameter, with a gloved fingertip to produce high shear until the rubbed paint became viscous and tacky. The coated chart was then allowed to dry at room temperature for 24 h. L*, a*, b* values were measured for the rubbed and unrubbed portions of the dried coating films using an X-Rite Color Master colorimeter and the root mean square color difference was calculated as:

$$\Delta E = \sqrt{((L^*_r - L^*_u)^2 + (a^*_r - a^*_u)^2 + (b^*_r - b^*_u)^2)}$$

where subscript r refers to rubbed and subscript u to unrubbed.

General Procedures for Preparation of Branched PAA

Synthesis of Linear Oligo(Tert-Butyl Acrylate) (OTBA)

Polydisperse OTBA

In the scheme above, each dot represents a single TBA repeat unit. Thus pentamers, hexamers, an octamer and a tetramer are depicted. Oligomerization was carried out by the syringe technique under dry argon in baked glass tubes equipped with a three-way stopcock or in sealed glass vials. A representative polymerization procedure for tert-butyl acrylate (TBA) using tert-butyl 2-bromoisobutyrate (t-BBiB) is provided. CuBr (100 mg, 0.697 mmol), TBA (6.07 mL, 41.8 mmol), acetone (1.46 mL), t-BBiB (0.52 mL, 2.79 mmol), and N,N,N',N'',N''-pentamethyldiethylenetriamine (PMDETA, 0.15 mL, 0.697 mmol) were sequentially added to a round-bottom flask (50 mL) filled with argon. Immediately after mixing, aliquots (0.50-1.0 mL each) of the solution were injected into baked glass tubes, which were then sealed (except when a stopcock was used) and placed in an oil bath kept at 40° C. At selected time intervals, samples of the polymerization mixture were terminated by cooling to −78° C. with dry ice-methanol. Monomer conversion was determined from residual monomer concentration measured by $^1$H NMR. The quenched solutions were evaporated and dissolved in THF, and the catalyst residue was removed by passing the THF solutions through silica gel. The solutions were evaporated to dryness, and further dried overnight under vacuum at room temperature. Results from a representative oligomerization procedure for TBA using t-BBiB is provided are Table 1.

TABLE 1

Structural Characterization of OTBA[a]

| Entry | Target $DP_n$ | Reaction Time (h) | $DP_{n,NMR}$ | $M_{n,SEC}$ | $M_w/M_n$ |
|---|---|---|---|---|---|
| 1 | 4 | 1.0 | 3.9 | 770 | 1.21 |
| 2 | 8 | 3.0 | 8.3 | 1150 | 1:23 |
| 3 | 15 | 4.0 | 17.1 | 1810 | 1.25 |

[a] $[t-BA]_0 = 5.2$ M; $[t-BBiB]_0 = 0.35$ M; $[CuBr]_0 = 87$ mM; $[PMDETA]_0 = 87$ mM in acetone at 40° C.

Separation of Oligo(Tert-Butyl Acrylate) (OTAB)

A BIOTAGE™ SP1 flash purification system was equipped with an appropriate column cartridge (KP SIL-340 g). The column was equilibrated with 4 column volumes of hexane. Crude OTBAs (7.0 g) were dissolved in 20.0 mL of hexane and loaded onto the column, followed by a 10 mL of hexane washes to complete the loading. The OTBA was eluted with hexane/ethyl acetate (EtOAc) mixtures, following a programmed gradient summarized in Table 2.

TABLE 2

Gradient Profile for Automated OTBA Separation (Eluent: Hexane/EtOAc)

| % ETOAc (start) | % EtOAc (end) | Column Volume (CV) |
|---|---|---|
| 0 | 5 | 2 |
| 5 | 25 | 12 |
| 25 | 75 | 4 |

The flow rate was set as 80 mL/min. The target OTBA ($DP_n=3$, 5, 7, and 14) were successfully separated and analyzed by MALDI-TOF for DP. The DP results were consistent with DP obtained by $^1$H NMR. Fractions of like DP were combined. The discrete OTBAs were evaporated overnight in vacuo at room temperature.

Synthesis of Oligo(Tert-Butyl Acrylate) Oligomonomers

-continued

The oligomonomers were prepared from well-separated OTBAs with $n_a$ of 3, 5, 7, and 14 by substitution of bromine at the OTBA chain-end with acrylic acid in the presence of 1,8-diazabicyclo[5.4.0]undec-7-ene (DBU). In a representative procedure, a mixture of OTBA (tetradecamer, 6.00 g, 2.98 mmol, 1.0 eq), ethyl acetate (10.0 mL), and DBU (0.89 mL, 5.96 mmol, 2.0 eq) were placed in 100 mL round-bottom flask. Acrylic acid (0.41 mL, 5.96 mmol, 2.0 eq) was slowly added. The solution was then stirred for 48 h at room temperature. The solution was diluted with EtOAc and washed with $NaHCO_3$ saturated solution (3×100 mL). The organic layer was dried, over anhydrous $MgSO_4$ for several hours, and the filtered solution was evaporated. The crude product was purified by silica gel column chromatography (EtOAc/hexane). The eluate was evaporated to dryness, and further dried overnight under vacuum at room temperature, providing 5.70 g of oligomonomer (95.1% yield).

Examples 1-4

General Atom-Transfer Radical-Copolymerization (ATRP) and Deprotection Procedure -continued Copolymerization was carried out by the syringe technique under dry argon in baked glass tubes equipped with a three-way stopcock or in sealed glass vials. A representative procedure for copolymerization of TBA with oligomonomer/t-BBiB/Ru(Ind)/n-Bu₃N is provided. Copolymerization conditions for Examples 1-4 are provided in the footnotes to Table 3 below. In a round-bottom flask (50 mL) filled with Ar was placed Ru(Ind) (15.5 mg, 0.02 mmol). Toluene (0.38 mL), oligomonomer (not precise, 15.4-mer, 0.346 g, 0.16 mmol), tetraline (0.01 mL), TBA (0.11 mL, 0.76 mmol), n-Bu₃N solution (0.50 mL, 400 mM, 0.20 mmol), and t-BBiB (7.50 μL, 0.04 mmol) were sequentially added, providing a total volume of 1.0 mL. Immediately after mixing, aliquots (0.20-0.30 mL each) of the solution were injected into baked glass tubes, which were then sealed (except when a stopcock was used) and placed in an oil bath kept at 80° C. At selected intervals, samples of the polymerization mixture were terminated by cooling to −78° C. in dry ice-methanol. Monomer conversion was determined from residual monomer concentration measured by $^1$H NMR with tetraline as internal standard. The quenched solutions were evaporated to dryness and further dried overnight under vacuum at room temperature. The copolymer (1 g) was dissolved in neat TFA (10 mL) and stirred overnight at room temperature. TFA was removed under reduced pressure. The crude product was dissolved in THF and precipitated in hexane to give the products as white solids in quantitative yield (>99%). The branched PAAs of Examples 1-4 obtained by the above synthesis routes are characterized in Table 3.

TABLE 3

Structural Characterization of Branched PAAs

| | | Branches | | | Entire Polymer | | | |
|---|---|---|---|---|---|---|---|---|
| Ex. | Backbone $DP_n^e$ | No branches | $DP_n^e$ (per branch) | $DP_n^a$ (all branches) | $DP_n^e$ | $M_n$ (g/mol)$^f$ | $D^f$ | DP Branch/ DP Backbone |
| 1$^a$ | 9 (6) | 4 (4) | 6 | 24 | 34 (30) | 4,400 | 1.28 | 4 |
| 2$^b$ | 20 (15) | 3 (3) | 15 | 45 | 72 (60) | 5,900 | 1.25 | 3 |
| 3$^c$ | 21 (18) | 3 (3) | 4 | 12 | 32 (30) | 4,700 | 1.37 | 0.67 |
| 4$^d$ | 27 (24) | 12 (12) | 8 | 96 | 125 (120) | 4,800 | 1.39 | 4 |

$^a$[t-BA]₀ = 1008 mM; [Oligomonomer]₀ = 1512 mM; [EBiB]₀ = 240 mM; [Ru(Ind)]₀ = 120 mM; [(n-Bu)₃N]₀ = 1200 mM in toluene at 80° C. for 24 h.
$^b$[t-BA]₀ = 1260 mM; [Oligomonomer]₀ = 252 mM; [EBiB]₀ = 80 mM; [Ru(Ind)]₀ = 40 mM; [(n-Bu)₃N]₀ = 400 mM in toluene at 80° C. for 48 h.
$^c$[t-BA]₀ = 504 mM; [Oligomonomer]₀ = 3024 mM; [EBiB]₀ = 160 mM; [Ru(Ind)]₀ = 80 mM; [(n-Bu)₃N]₀ = 800 mM in toluene at 80° C. for 25 h.
$^d$[t-BA]₀ = 1068 mM; [Oligomonomer]₀ = 532 mM; [EBiB]₀ = 40 mM; [Ru(Ind)]₀ = 20 mM; [(n-Bu)₃N]₀ = 200 mM in toluene at 100° C. for 72 h.
$^e$$DP_n$, measured by 1H NMR. $DP_n$ in parentheses represents target values.
$^f$Polydispersity, calculated from $DP_n$.

Coating Compositions

Two aqueous coating compositions were utilized to evaluate the branched PAAs of Ex. 1-4, a white gloss with a pigment volume concentration (PVC) of 16% and a white flat with a PVC of 65%. The compositions are summarized in Tables 4a and 4b, and 5a and 5b, respectively. For the 16 PVC white gloss composition, the pigment grind components were mixed separately to disperse the titanium dioxide. Then the components of the letdown were added to the pigment grind with further mixing. For the 65 PVC white flat composition, the pigment grind components were mixed separately to disperse the titanium dioxide and extenders. The latex binder was added to the pigment grind quickly, with good stirring, and the mixture was stirred for 30 min. The defoamer was added, and the thickener, premixed with water before adding, was added to obtain a final viscosity of 114 KU. Water was added to adjust the final volume to 100 gal, and the pH was adjusted to 8.

TABLE 4a

16 PVC White Gloss Composition

| Component Name | Component Description | Amount (pounds) | Amount (gallons) |
|---|---|---|---|
| Pigment Grind | | | |
| Water | Diluent | 38.86 | 4.66 |
| KATHON ™ LX | 1.5% (preservative) | 2.51 | 0.30 |
| BYK-022 ™ | Defoamer | 0.99 | 0.12 |
| AMP-95 ™ | Neutralizing agent (base) | 0.93 | 0.12 |
| TAMOL ™ 1124 | Dispersant | 1.85 | 0.19 |
| TI-PURE ™ R-706 | Titanium dioxide (pigment) | 185.04 | 5.54 |
| Water | Diluent | 33.85 | 4.06 |
| Total | Pigment Grind | 264.027 | 14.981 |
| Letdown | | | |
| RHOPLEX ™ SG-10M | Latex (binder) | 548.35 | 62.08 |
| TEXANOL ™ | Coalescent | 22.82 | 2.88 |
| Water | Water | 32.97 | 3.95 |

TABLE 4a-continued

16 PVC White Gloss Composition

| Component Name | Component Description | Amount (pounds) | Amount (gallons) |
|---|---|---|---|
| ACRYSOL ™ RM-2020E | Thickener | 23.07 | 2.65 |
| ACRYSOL ™ RM-825 | Nonionic thickener | 1.38 | 0.16 |
| TERGITOL ™ 15-S-9 | Surfactant | 2.01 | 0.23 |
| Water | Diluent | 109.07 | 13.07 |
| Total | Letdown | 739.654 | 85.019 |
| Total | Pigment Grind + Letdown | 1003.681 | 100.000 |

TABLE 4b

16 PVC White Gloss Parameters

| Property | Value[a] |
|---|---|
| Total Volume (gal) | 100.0 |
| Total Weight (lb) | 1003.7 |
| Total PVC (%) | 16.0 |
| Volume Solids (%) | 34.6 |
| Weight Solids (%) | 45.8 |
| Density (lb/gal) | 10.0 |
| Dry Density (lb/gal) | 13.2 |
| Total Coalescent (%) | 8.3 |
| Total Dispersant (%) | 0.500 |
| VOC[b] (g/L) | 79.6 |
| Fraction of CPVC[c] (%) | 31.3 |

[a]Neglecting additives.
[b]Tap water excluded.
[c]CPVC is Critical Pigment Volume Concentration.

TABLE 5a

65 PVC White Flat Composition

| Component Name | Component Description | Amount (pounds) | Amount (gallons) |
|---|---|---|---|
| *Pigment Grind* | | | |
| Water | Diluent | 189.29 | 22.68 |
| CELLOSIZE ™ QP-4400H | Thickener | 6.72 | 0.62 |
| Sodium hydroxide (10%) | Neutralizing Agent (base) | 1.35 | 0.15 |
| TAMOL ™ 945 | Dispersant | 4.03 | 0.37 |
| KTPP | Dispersant | 0.67 | 0.03 |
| BYK-022 ™ | Defoamer | 1.60 | 0.19 |
| KATHON ™ LX 1.5% | Preservative | 1.60 | 0.19 |
| TI-PURE ™ R-706 | Titanium dioxide (pigment) | 126.85 | 3.80 |
| MISTRON ™ 353 | Extender | 67.33 | 2.89 |
| OMYACARB ™ 5 | Extender | 134.66 | 5.97 |
| OMYACARB ™ 10 | Extender | 201.99 | 8.96 |
| SATINTONE ™ W/WHITEX ™ | Extender | 67.33 | 3.07 |
| Water | Diluent | 141.30 | 16.93 |
| Total | Pigment grind Letdown | 944.710 | 65.850 |
| MOWILITIH ™ LDM 1871 | Latex binder | 243.04 | 27.22 |
| BYK-022 ™ | Defoamer | 0.93 | 0.11 |
| Water | Diluent | 32.16 | 3.85 |

TABLE 5a-continued

65 PVC White Flat Composition

| Component Name | Component Description | Amount (pounds) | Amount (gallons) |
|---|---|---|---|
| CELLOSIZE ™ QP-4400H | Thickener | 1.36 | 0.13 |
| Water | Diluent | 23.72 | 2.84 |
| Total | Letdown | 301.211 | 34.150 |
| Total pigment grind + letdown | | 1245.921 | 100.000 |

TABLE 5b

65 PVC White Flat Parameters

| Property | Value[a] |
|---|---|
| Total Volume (gal) | 100.0 |
| Total Weight (lb) | 1245.9 |
| Total PVC (%) | 65.0 |
| Volume Solids (%) | 38.0 |
| Weight Solids (%) | 58.2 |
| Density (lb/gal) | 12.5 |
| Dry Density (lb/gal) | 18.8 |
| Total Coalescent (%) | 0.0 |
| Total Dispersant (%) | 0.414 |
| VOC[b] (g/L) | 0.0 |
| Fraction of CPVC[c] (%) | 105.1 |

[a]Neglecting additives.
[b]Generic water excluded.
[c]CPVC is Critical Pigment Volume Concentration.

Kubetka-Munk Hiding (S/mil) Test Results

The effectiveness of the PAAs of Ex. 1-4 in dispersing titanium dioxide was evaluated in the 16 PVC white gloss coating composition by measuring the hiding power, or opacity, of the resulting paint films using the Kubelka-Munk S/mil hiding test method described above. "S" is a dimensionless measure of light scattered by the paint film and is normalized for paint film thickness in mils. Comparison was made to a linear PAA having a number-average molecular weight of 2,000 g/mol, available from Polysciences, Inc., Warrington, Pa. (Comparative Example 1), and TAMOL™ 1124, available from Dow Chemical Co., also a linear PAA (Comparative Example 2). The PAAs were evaluated in the 16 PVC white gloss paint composition described in Tables 4a and 4b. The PAAs of Examples 1-4 and Comparative Example 2 were used on an equal solids basis as the amount of TAMOL™ 1124 of Comparative Example 1 reported in Table 4a. The amounts of AMP-95 and water in each example were adjusted to maintain constant pH and constant composition weight. Before preparing the paint films, the compositions were heat aged for 30 days at 50° C. to simulate 6 to 12 months of aging at room temperature.

Figure 3:
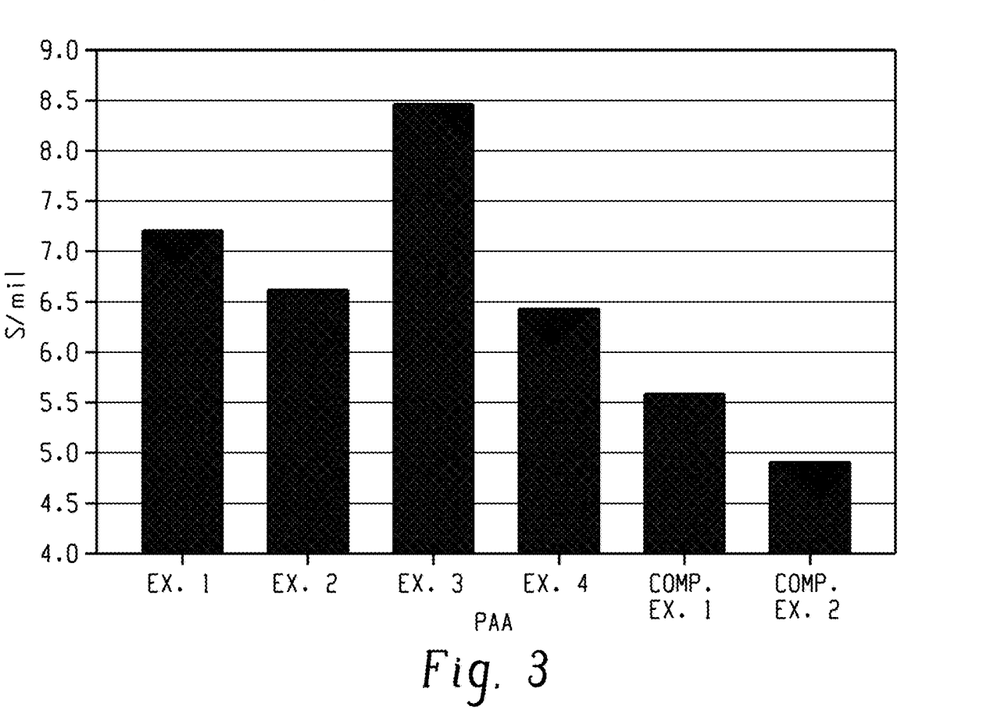
FIG. 3 is a bar chart of the Kubelka-Munk hiding value S/mil for 16 PVC gloss white paint films formed from coating compositions with titanium dioxide dispersed by the PAAs of Ex. 1-4 and Comp. Ex. 1-2, after heat aging of the coating compositions for 30 days at 50° C.

The results of the Kubelka-Munk hiding test are plotted in FIG. 3. S/mil values of 5.1 and 4.9 were obtained for the linear PAAs of Comp. Ex. 1 and 2, respectively. An S/mil of about 5 is commonly observed with prior art dispersants. As can be seen from FIG. 3, the branched PAAs of Ex. 1-4 all provided increased light scattering, and therefore opacity, compared to the linear PAAs. The skilled person in the art will recognize the S/mil values of 6.6 and 6.4 observed for Ex. 2 and 4, respectively, as excellent, and the S/mil values of 7.2 and 8.5 observed for Ex. 1 and 3, respectively, as outstanding.

Rub-Up Test Method Results

As discussed in the Kubelka-Munk hiding test results above, when the branched PAAs of Ex. 1-4 were used to disperse titanium dioxide, increased hiding was obtained compared to the linear PAAs of Comp. Ex. 1-2. The branched PAAs of Ex. 1-4 were also provided increased color strength for added colorants. Colorants containing colored pigments provide tint to coating compositions such as paints and semi-transparent stains. Factors affecting the amount of colorant necessary to obtain a desired color are the light scattering efficiency and the light absorbing efficiency of the colored pigments. The light scattering and absorbing efficiencies of colored pigments are affected by the extent of dispersion of the colored pigments in the coating composition. Colored pigment particles that are well dispersed and separated from each other are believed to provide increased color and optionally increased hiding. Such coating compositions can be formulated to a desired color with lower levels of the colored pigments than compositions in which the colored pigments are poorly dispersed. Alternatively, coating compositions having well dispersed colored pigments display more intense colors, and permit the preparation of colored coatings with a broader color palette.

The rub-up test described above was used to determine the effectiveness of dispersion of colored pigments in the 16 PVC white gloss coating composition described in Tables 4a and 4b. The colorant was COLORTREND™ 888 Lamp Black from Chromaflo Technologies Corp., 2600 Michigan Ave, P.O. Box 816, Ashtabula, Ohio 44005, used at the rate of 4 oz. per gallon paint. Aliquots of 30 mL were taken for each of the paints for color acceptance testing. For the 16 PVC white gloss paint, 30 mL was 36.079 g. To these aliquots was added the lamp black colorant at the rate of 4 oz. per gallon paint. Thus 1.31 g of colorant was added to each 30 mL aliquot.

Figure 4:
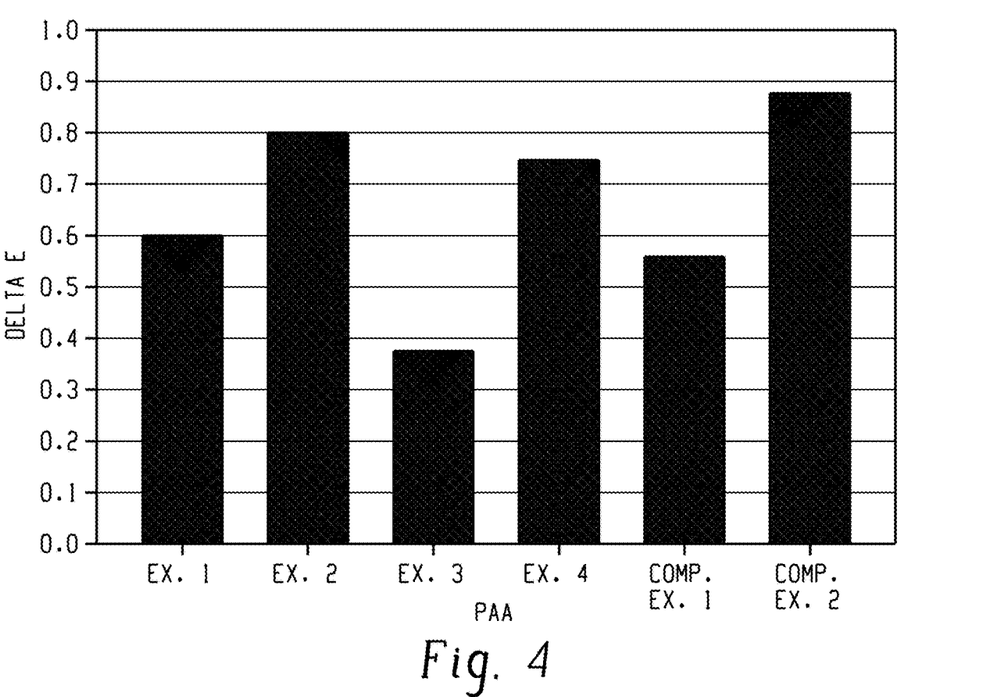
FIG. 4 is a bar chart of ΔE in the rub-up test of 16 PVC gloss white coating compositions with pigment dispersed by the PAAs of Ex. 1-4 and Comp. Ex. 1-2.

In this test, the lower the delta E ($\Delta E$), the better the colored pigments are dispersed. A non-zero $\Delta E$ indicates that the shear applied by rubbing the applied coating composition with a gloved fingertip serves to further disperse the colorant, and the lower the $\Delta E$, the closer the colored pigment is to its optimally dispersed state. The results of the rub-up test are plotted in FIG. 4. As can be seen from FIG. 4, the branched PAAs of Ex. 1-4 all provide decreased $\Delta E$ (0.60, 0.80, 0.38, and 0.75, respectively) relative to Comp. Ex. 2 (TAMOL™ 1145), which had a $\Delta E$ of 0.87. Moreover, Ex. 3 had a decreased $\Delta E$ compared to even Comp. Ex. 1 (0.38 vs. 0.56), which is research grade linear PAA from Polysciences, Inc.

Viscosity Stability

The viscosity of wet coating compositions increases slowly over time. The effect of the branched PAAs of Ex. 1-4 on the viscosity stability of the 65 PVC flat white paint described in Tables 5a and 5b was evaluated. KU viscosity measurements are done at mid-shear, or shear rates comparable to those associated with common methods of application of the coating composition to a substrate, i.e. brushing or rolling. Viscosity was measured before and after heat aging for 30 days at 50° C., to simulate 6 to 12 months of aging at room temperature. The results are summarized in Table 6, and delta KU ($\Delta KU$) is plotted in FIG. 5.

TABLE 6

Viscosity Data for Heat Aging of 65 PVC White Gloss Composition

| Example | initial (KU) | Final (KU) | Change ($\Delta KU$) |
|---|---|---|---|
| 1 | 110 | 117 | 7 |
| 2 | 113 | 120 | 7 |
| 3 | 110 | 114 | 4 |
| 4 | 113 | 121 | 8 |
| Comp. Ex. 2 | 105 | 115 | 10 |

Figure 5:
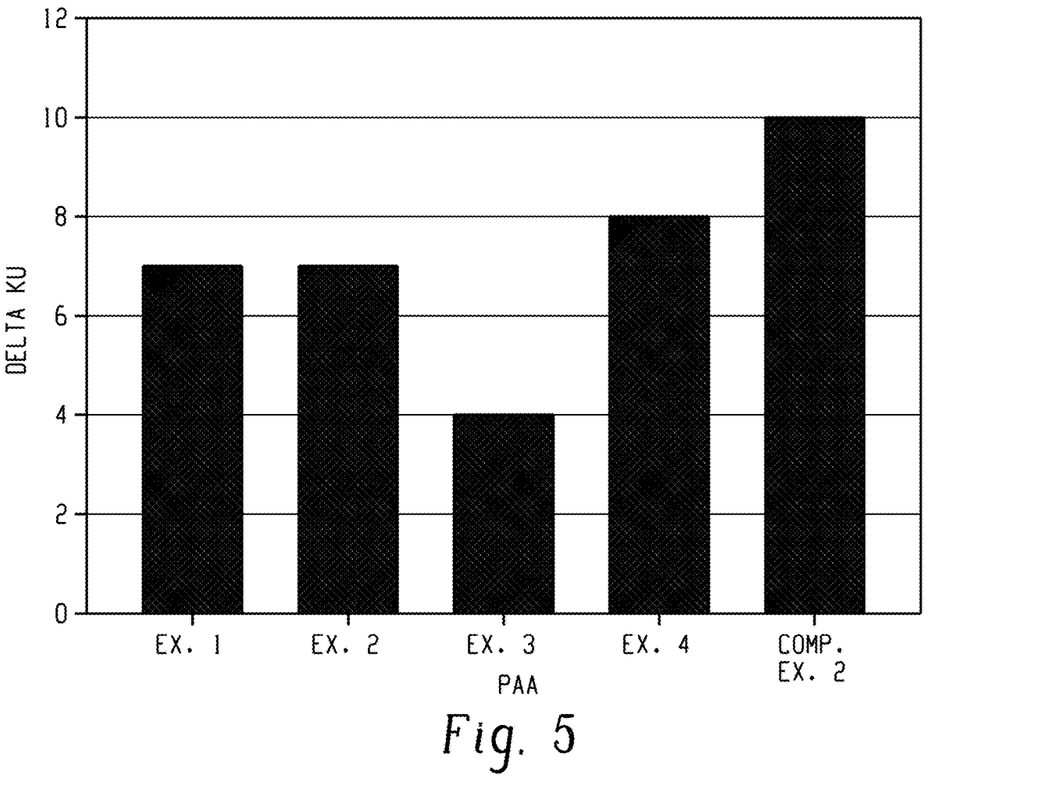
FIG. 5 is a bar chart of ΔKU upon heating aging of 65 PVC gloss white coating compositions containing the PAAs of Ex. 1-4 and Comp. Ex. 2 for 30 days at 50° C.

As can be seen from Table 6 and FIG. 5, the coating compositions containing the branched PAAs of Ex. 1-4 had decreased change in viscosity compared to Comp. Ex. 2 (TAMOL™ 945).

As used herein, the term "(meth)acrylic acid" denotes acrylic acid, methacrylic acid, or a combination of acrylic acid and methacrylic acid. The acronym "PAA" refers to polyacrylic acid in particular. Similarly, the term "(meth)acrylate" denotes acrylate, methacrylate, or a combination of acrylate and methacrylate.

As used herein, the term "nonionic monomer" refers to ethylenically unsaturated monomers that are not ionized, i.e. they do not bear a charge, at pH 1 to 14.

As used herein, the term "degree of polymerization ($DP_n$)" refers to the total number of repeat units "n" in a polymer, including branches.

The compositions, methods, and articles can alternatively comprise, consist of, or consist essentially of, any appropriate materials, steps, or components herein disclosed. The compositions, methods, and articles can additionally, or alternatively, be formulated so as to be devoid, or substantially free, of any materials (or species), steps, or components, that are otherwise not necessary to the achievement of the function or objective of the compositions, methods, and articles. All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges, including for example "5 wt. % to 25 wt. %"). "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements can be combined in any suitable manner in the various embodiments.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

While particular embodiments have been described, alternatives, modifications, variations, improvements, and substantial equivalents that are or may be presently unforeseen may arise to applicants or others skilled in the art. Accordingly, the appended claims as filed and as they can be amended are intended to embrace all such alternatives, modifications variations, improvements, and substantial equivalents.

The invention claimed is:

1. A branched polycarboxylic acid or salt thereof, wherein:
   the branched polycarboxylic acid is derived from polymerization of (meth)acrylic acid or salt thereof;
   the average degree of polymerization is 10 to 150;
   the average number of branches is 2 to 20; and
   the average degree of polymerization of the branches is 2 to 30.

2. The branched polycarboxylic acid or salt thereof of claim 1, wherein the polydispersity of the branches is less than or equal to 2.5.

3. The branched polycarboxylic acid or salt thereof of claim 1, wherein the salt is an alkali metal salt, an alkaline earth metal salt, an ammonium salt, a quaternary ammonium salt, or a combination comprising at least one of the foregoing salts.

4. The branched polycarboxylic acid or salt thereof of claim 1, wherein the branches are all adjacent to one another.

5. An aqueous dispersion comprising:
   a branched polycarboxylic acid or salt thereof, wherein the average number of branches is 2 to 100 and the average degree of polymerization of the branches is 2 to 50; and wherein the polycarboxylic acid is derived from polymerization of (meth)acrylic acid or salt thereof; and
   a pigment.

6. An aqueous coating composition comprising:
   the aqueous dispersion of claim 5;
   a polymeric binder; and
   a rheology modifier.

7. The aqueous dispersion of claim 5, wherein the average degree of polymerization of the branched polycarboxylic acid or salt thereof is 10 to 500.

8. The aqueous dispersion of claim 5, wherein the polydispersity of the branches of the branched polycarboxylic acid or salt thereof is less than or equal to 2.5.

9. The aqueous dispersion of claim 5, wherein the salt is an alkali metal salt, an alkaline earth metal salt, an ammonium salt, a quaternary ammonium salt, or a combination comprising at least one of the foregoing salts.

10. The aqueous dispersion of claim 5, wherein the branches of the branched polycarboxylic acid or salt thereof are all adjacent to one another.

* * * * *